United States Patent
Cohen

(10) Patent No.: US 11,233,785 B2
(45) Date of Patent: Jan. 25, 2022

(54) SECURE SYSTEMS AND METHODS FOR HOSTED AND EDGE SITE SERVICES

(71) Applicant: Verizon Patent and Licensing Inc., Arlington, VA (US)

(72) Inventor: Beth F. Cohen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/870,526

(22) Filed: May 8, 2020

(65) Prior Publication Data

US 2021/0352061 A1 Nov. 11, 2021

(51) Int. Cl.
| | |
|---|---|
| *H04L 29/06* | (2006.01) |
| *H04W 48/16* | (2009.01) |
| *G06F 9/50* | (2006.01) |
| *H04L 29/08* | (2006.01) |
| *H04W 16/10* | (2009.01) |

(52) U.S. Cl.
CPC .......... *H04L 63/083* (2013.01); *G06F 9/5072* (2013.01); *G06F 9/5077* (2013.01); *H04L 67/1097* (2013.01); *H04W 16/10* (2013.01); *H04W 48/16* (2013.01)

(58) Field of Classification Search
CPC .. H04L 63/083; H04L 67/1097; H04W 16/10; H04W 48/16; G06F 9/5077; G06F 9/5072
See application file for complete search history.

(56) References Cited

U.S. PATENT DOCUMENTS

| | | | |
|---|---|---|---|
| 9,076,311 B2 * | 7/2015 | Rachamadugu | G11B 27/105 |
| 2002/0049841 A1 * | 4/2002 | Johnson | H04L 67/10 709/225 |
| 2021/0144517 A1 * | 5/2021 | Guim Bernat | H04L 9/3213 |

* cited by examiner

*Primary Examiner* — Kristie D Shingles

(57) ABSTRACT

A system described herein may provide techniques for providing secure, configurable, network services via a dynamic gateway. Network services may be provided using virtual machines, pods, and/or containers. The dynamic gateway may provide hosted services and edge site services. The dynamic gateway may provide separate secure access to the hosted services and edge site services, utilizing different administrator credentials for the hosted services and edge site services. A host services orchestrator may receive usage information from the dynamic gateway. The host services orchestrator may generate a usage prediction based on the received information. The host services orchestrator may, based on the usage prediction, allocate provided services between edge site and hosted services and may further allocate hardware and/or software resources of the dynamic gateway. The dynamic gateway hardware resources may be managed by the hosted services and access may be provided to the edge site services via the hosted services.

20 Claims, 8 Drawing Sheets

SECURE SYSTEMS AND METHODS FOR HOSTED AND EDGE SITE SERVICES

BACKGROUND

Various establishments may utilize various network services. Such services are deployed via local hardware resources that are not reconfigurable or scalable. Deployment of services may require provider intervention.

DETAILED DESCRIPTION OF THE PREFERRED EMBODIMENTS

The following detailed description refers to the accompanying drawings. The same reference numbers in different drawings may identify the same or similar elements.

Embodiments described herein provide for establishment, deployment, and utilization of network services. Such network services may include "local" or "edge site" services and "cloud" or "hosted" services. Some services may be implemented using a combination of edge site and hosted services.

In some embodiments, such edge site and/or local services may include, or be implemented by, virtual machines acting as application hosts. Services may include, or be implemented by, a set of containers, pods, virtual machines, and/or other discrete sets of resources.

A dynamic gateway device of some embodiments may provide local services or "edge site" services and cloud services or "hosted" services. The dynamic gateway device may include an interface that may be provided by (or via) the hosted services. The interface may provide various hosted services (and/or access to various hosted services) to the edge site services (e.g., networking services such as a router). The interface may provide secure separation of edge site services (e.g., edge site applications and associated data) and hosted services (e.g., network access). This separation may preclude edge site services from accessing, modifying, etc. certain hosted services, and may further preclude hosted services from accessing, modifying, etc. certain edge site services.

For example, as described herein, administration of local and hosted services may require different authentication credentials. The local and hosted services may share dynamic gateway resources including networking, processing, and storage or memory. The dynamic gateway resources may be allocated based on current and/or predicted usage. Resources, such as storage, that are allocated to a particular service (e.g., a container or virtual machine associated with edge site services) may or may not be accessible to other services (e.g., an edge site container may be accessible to edge site services but not to host services), and may include various security features. The dynamic gateway may provide network connectivity and management features, security features, and configurable service provision and management features.

Figure 1:
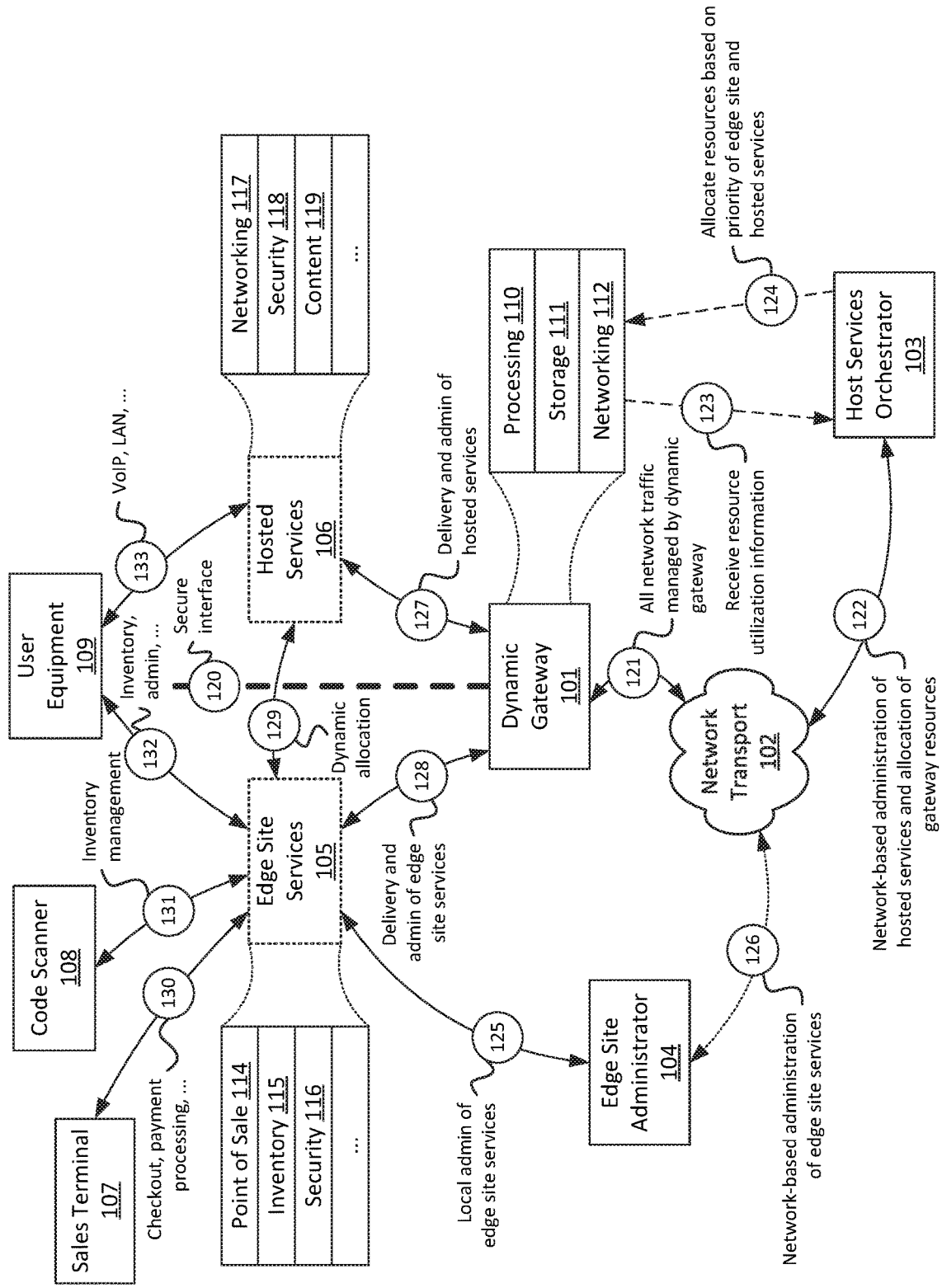
FIG. 1 illustrates an example overview of one or more embodiments described herein, in which a dynamic gateway may include secure hosted services and edge site services.

FIG. 1 provides an overview of some of the concepts discussed above. Dynamic gateway 101 may be implemented as a single device or set of associated components (e.g., rack components) for ease of deployment at an establishment such as a retail store. Dynamic gateway 101 may include processing resources 110 (e.g., one or more processors), storage resources 111, and networking resources 112.

Networking resources 112 may include various network interfaces or other resources that are able to interact with one or more network transports 102 or other appropriate communication resources. Network transport 102 may include various wired or wireless network connections or interfaces, such as a LAN provided via Ethernet, an Internet connection provided via fiber optic cable, a Fifth Generation ("5G") network connection provided via a cellular radiotelephone, and/or other appropriate connections and interfaces. Network transport 102 may provide access to various Internet or cloud-based resources. Network transport 102 may allow communication among multiple dynamic gateways 101, host services orchestrator 103, edge site administrator devices or consoles 104, and/or other appropriate resources (e.g., cloud-based resources). Dynamic gateway 101 may include various components or interfaces that may allow connection to the various network transports 102, such as an Ethernet port, Wi-Fi radio, cellular radiotelephone, etc.

Dynamic gateway 101 may be deployed at a remote location (e.g. a geographic site location separated from other site locations associated with an organization). For instance, in some embodiments, an instance of dynamic gateway 101 may be deployed at each retail store associated with the same retail chain. Edge site administrator 104 may manage various configuration settings or data associated with edge site services 105 provided via associated dynamic gateways 101. Similarly, host services orchestrator 103 may manage various configuration settings or data associated with hosted services 106 provided via multiple dynamic gateways 101, which may include multiple sets of associated dynamic gateways 101 (e.g., multiple retail chains, each having multiple locations). Hosted services 106 may be at least partly provided via various other network-connected resources, such as servers, storages, cloud computing systems, and/or other appropriate resources accessible to dynamic gateway 101 via network transport 102. Host services orchestrator 103 may, in some embodiments, be a device or system that is remote from dynamic gateway 101.

Various local devices, such as sales terminal 107, code scanner 108, and/or UE 109 may utilize the edge site services 105 and/or hosted services 106 provided via dynamic gateway 101. Thus, for instance, continuing the retail example, edge site services 105 may include point of sale ("POS") services 114, inventory management services 115, and edge site security services 116, while hosted services may include networking services 117, hosted security services 118, and content services 119 (e.g., Voice over Internet Protocol ("VoIP") services, video communications services, conferencing services, etc.).

Different implementations may include various different combinations of edge site services 105 and hosted services 106. For example, a dynamic gateway 101 deployed at a hotel may provide edge site services 105 including entertainment applications (e.g., a pay-per-view movie service), while hosted services 106 may include Wi-Fi connectivity for patrons of the hotel. As another example, a dynamic gateway 101 deployed at an office building may provide edge site services 105 including scheduling and booking of conference rooms, while hosted services 106 may include a hosted VoIP service utilized by employees across multiple office locations (and multiple dynamic gateways 101). As another example, a dynamic gateway 101 deployed at a hospital may provide edge site services 105 including collection, filtering, and sharing of data from patient monitoring devices, while hosted services 106 may include processing of insurance claims or verification of patient coverage. As still another example, a dynamic gateway 101 deployed at a restaurant may provide edge site services 105 including employee time tracking, while hosted services 106 may include credit card payment processing.

Dynamic gateway 101 may provide a secure interface 120 such that edge site services 105 may utilize or interact with hosted services 106, while restricting access to configuration data or other secure information. In some embodiments, secure interface 120 may be, or may include, one or more application programming interfaces ("APIs"), which may expose or provide certain subsets of functionality, associated with hosted services 106, to edge site services 105, UE 109, and/or other devices or systems. Thus, for example, edge site services 105 (such as PoS services 114, inventory management services 115, etc.) may utilize hosted payment processing services such as credit card payment processing, but storage resources 111 associated with edge site services 105 may only be accessible to edge site administrator 104 (or local devices 107-109, as specified by edge site administrator 104). Likewise, storage resources 111 or other resources associated with hosted services 106 may not be accessible to edge site administrator 104 or local devices 107-109, as specified by host services orchestrator 103.

In some embodiments, hosted services 106 of dynamic gateway 101 may manage all messaging and network traffic 121 associated with dynamic gateway 101. For example, network traffic sent to and/or from edge site services 105 may be handled, processed, etc. by one or more hosted services 106. Host services orchestrator 103 may provide network-based administration 122 of hosted services 106 and allocation of gateway resources 110-112 at gateway 101. For example, in some embodiments, hosted services orchestrator 103 may include or implement a virtual machine and/or container management or provisioning service, such as OpenStack, Kubernetes, or some other suitable virtual machine and/or container management or provisioning service.

Host services orchestrator 103 may, in some embodiments, receive resource utilization information 123 from dynamic gateway 101 via network transport 102. Such resource utilization information 123 may include, for instance, amount of allocated storage 111 that is in use, percentage of allocated processing 110 being utilized, and/or usage of networking resources 112. Furthermore, the utilization information 123 may include information related to application type and/or associated resources thereof (e.g., content services 119 may utilize a relatively large share of networking resources 112 and a relatively small share of storage resources 111, while inventory management service 115 may utilize a relatively large share of storage 111, while utilizing a relatively small share of networking resources 112). In addition, utilization information 123 may include measured capacity and/or availability of network resources. For instance, utilization information 123 may include an indication that a network resource or connection is unresponsive or otherwise unavailable.

Host services orchestrator 103 may direct resource allocation 124 at dynamic gateway 101 based on received usage information, prioritization of services, usage history, and/or other relevant factors. Such resource allocation 124 may be at least partly implemented by dynamic gateway 101 based on configuration data or other information received from host services orchestrator 103. For instance, resource allocation update messages may be sent by host services orchestrator 103 at periodic intervals, whenever an updated resource allocation is generated or otherwise available, and/or at other appropriate times. Dynamic gateway 101 may be able to implement the resource allocation based on resource allocation information previously received from host services orchestrator 103, such as when no network connection is available.

For instance, continuing the retail example, host services orchestrator 103 may allocate relatively more resources 110-112 of dynamic gateway 101 to a POS application 114 during open hours than when a store is closed. As another example, host services orchestrator 103 may prioritize content services 119 over inventory management services 115 when allocating networking resources 112, as content services 119 may require unpredictable network capacity as content is requested or streamed, whereas inventory services 115 may utilize network resources 112 at regular, expected intervals (e.g., inventory information may be distributed among stores, and/or a central data repository, on a nightly basis).

In some embodiments, machine learning may be used to predictively model expected resource usage based on historical usage over time. Predicted resource usage may be compared to actual usage to train the machine learning model.

Edge site administrator 104 may provide local administration 125 of edge site services 105 (e.g., when the edge site administrator terminal is located at the edge site) and/or network-based administration 126 of edge site services 105 (e.g., edge site administrator 104 may be located at a particular store or office and may interact with associated dynamic gateways 101 across one or more networks). Edge site administrator 104 may manage an application library, set of containers, set of virtual machines, etc. implemented using dynamic gateway 101, manage access to applications or other resources of dynamic gateway 101, and/or otherwise manage edge site services 105 via dynamic gateway 101.

A dashboard or other appropriate interfaces, tools, or features may allow edge site administrator 104 to define a catalog or listing of applications, assign priority rankings among the applications, define access control or security features, and/or otherwise configure provision of edge site services 105. Such interfaces, tools, etc. may be inaccessible by hosted services 106. For example, such interfaces, tools, etc. may be associated with an authentication mechanism (e.g., user name and password, secure token, biometric authentication, etc.) that is unavailable to hosted services 106, and/or to a user associated with hosted services 106.

Likewise, access to hosted services 106 may be restricted from edge site services 105 and/or edge site administrator 104 (e.g., other than particular services for which an API or other interface is provided).

The edge site administrator dashboard may be provided as a web-based interface in some embodiments. The edge site administrator dashboard may include a listing of available hosted services 106 for enablement and/or configuration, where the listing of available hosted services and/or available configuration settings may be defined by host services orchestrator 103. The dashboard may further allow an administrator to configure various services, such as by activating services, deactivating services, specifying access restrictions, selecting content items, defining filters, etc. An administrator may select, for example, a managed WiFi service, a financial transactions service, and a news aggregation service. The administrator may further specify a region filter for application to the news aggregation service.

Continuing the retail store example, edge site administrator 104 may define, for example, a first instance of POS service 114 associated with sales terminal 107 (e.g., a dedicated cash register), a second instance of POS service 114 associated with UE 109 (e.g., a tablet device used as a sales terminal), and an instance of inventory service 115 associated with UE 109. POS service 114 may be associated with higher processing and networking priority than inventory service 115, while inventory service 115 may be associated with higher storage priority than POS service 114. Thus, for instance, during times of heavy network load, host services orchestrator 103 may allocate resources 124 such that inventory updates are stored in a local queue for later uploading, while POS transactions are processed in near real-time. Edge site administrator 104 may also select or define hosted services, including for example, activating a video conferencing service and deactivating a news aggregation service via the edge site administrator dashboard.

Host services orchestrator 103 may manage an application library, set of containers, and/or set of virtual machines implemented using dynamic gateway 101, manage access to applications or other resources of the dynamic gateway 101, and/or otherwise manage provision of hosted services 106 via dynamic gateway 101. In addition, host services orchestrator 103 may manage prioritization among not only hosted services 106 but between hosted services 106 and edge site services 105. For instance, hosted security services 118 and edge site security services 116 may be prioritized over other services. As another example, access to available storage resources 111 may be provided to edge site services 105 with a higher priority than hosted services 106. Such prioritization may be at least partly dependent on currently available resources (e.g., if a remote resource is available, storage resources 111 may not be allocated to an application associated with the remote resource, whereas if the remote resource is not available, some portion of storage 111 may be set aside to store queued updates).

Continuing the retail store example, host services orchestrator 103 may define, for example, a networking resource 117 (e.g., a router) for use by edge site services 105, hosted security features 118 (e.g., virtual private networking ("VPN"), firewall, user authentication services and/or encryption), payment processing, and a content service 119 associated with UE 109 (e.g., a dedicated application may be included in the application library associated with edge site services 105). Security features 118 may be associated with higher processing and storage priority than payment processing service, while the payment processing service may be associated with higher networking priority than edge site services 105. Thus, for instance, during times of heavy network load, host services orchestrator 103 may allocate resources 124 such that inventory updates are stored in a local queue for later uploading, while payments are processed in near real-time.

Host services orchestrator 103 may automatically define, enable, and/or otherwise configure various hosted services 106, as selected, enabled, and/or otherwise configured using the edge site administrator dashboard. For instance, content delivery services 119 may be automatically deployed to the dynamic gateway 101 by the host services orchestrator 103 based on selections and settings received via the edge site administrator dashboard. Such service deployment may include updating priority information associated with hosted services 106, installing or activating various containers, pods, or applications, updating data or configuration information at the dynamic gateway 101, and/or other appropriate ways of updating provided services.

Dynamic gateway 101 may provide delivery and administration 127 of hosted services 106 and delivery and administration 128 of edge site services 105. Services may be delivered via various appropriate components either included at dynamic gateway 101 or communicatively coupled thereto. Such components may include, for instance, routers, wired or wireless communication elements, radio communication elements, and/or other appropriate components. In some embodiments, as described below, hosted services 106 may have access to physical hardware network interfaces associated with dynamic gateway 101, and may provide virtual network interfaces for use by edge site services 105. In this manner, network administration or policies associated with dynamic gateway 101 (and thus, with edge site services 105) may be able to be performed by an owner, administrator, or other authorized entity associated with hosted services 106.

In some embodiments, edge site administrator 104 may be able to specify further network administration or policies for edge site services 105. Such administration or policies, specified by edge site administrator 104 may be used in concurrence with administration or policies applied by hosted services 106. In some embodiments, even though less restrictive policies may be specified by edge site administrator, such policies may be overridden (either explicitly or inherently) by more restrictive policies applied by hosted services 106. For example, where policies associated with edge site services 105 may not filter or drop certain traffic, policies implemented by hosted services 106 may filter or drop such traffic.

In some embodiments, dynamic gateway 101 may dynamically allocate 129 resources associated with dynamic gateway 101 (e.g., processing resources 110, storage resources 111, etc.) between edge site services 105 and hosted services 106. For example, inventory management services 115 may send live updates to other associated dynamic gateways 101, via hosted services 106, when network utilization is less than a specified threshold (e.g., fifty percent of available throughput), but may queue such updates, via edge site services 105, when network utilization is above the specified threshold.

Sales terminal 107 or other dedicated local devices may access services 130 such as checkout, payment processing, inventory management, etc. using edge site services 105 platform. Multiple sales terminals 107 may be deployed at each associated retail store. Code scanner 108 and/or other dedicated local devices may access services 131 such as inventory management using edge site services 105. UE 109 may access services 132 such as inventory or edge site administrator services utilizing edge site services 105 and may access services 133 such as content services and networking using hosted services 106.

Figure 2:
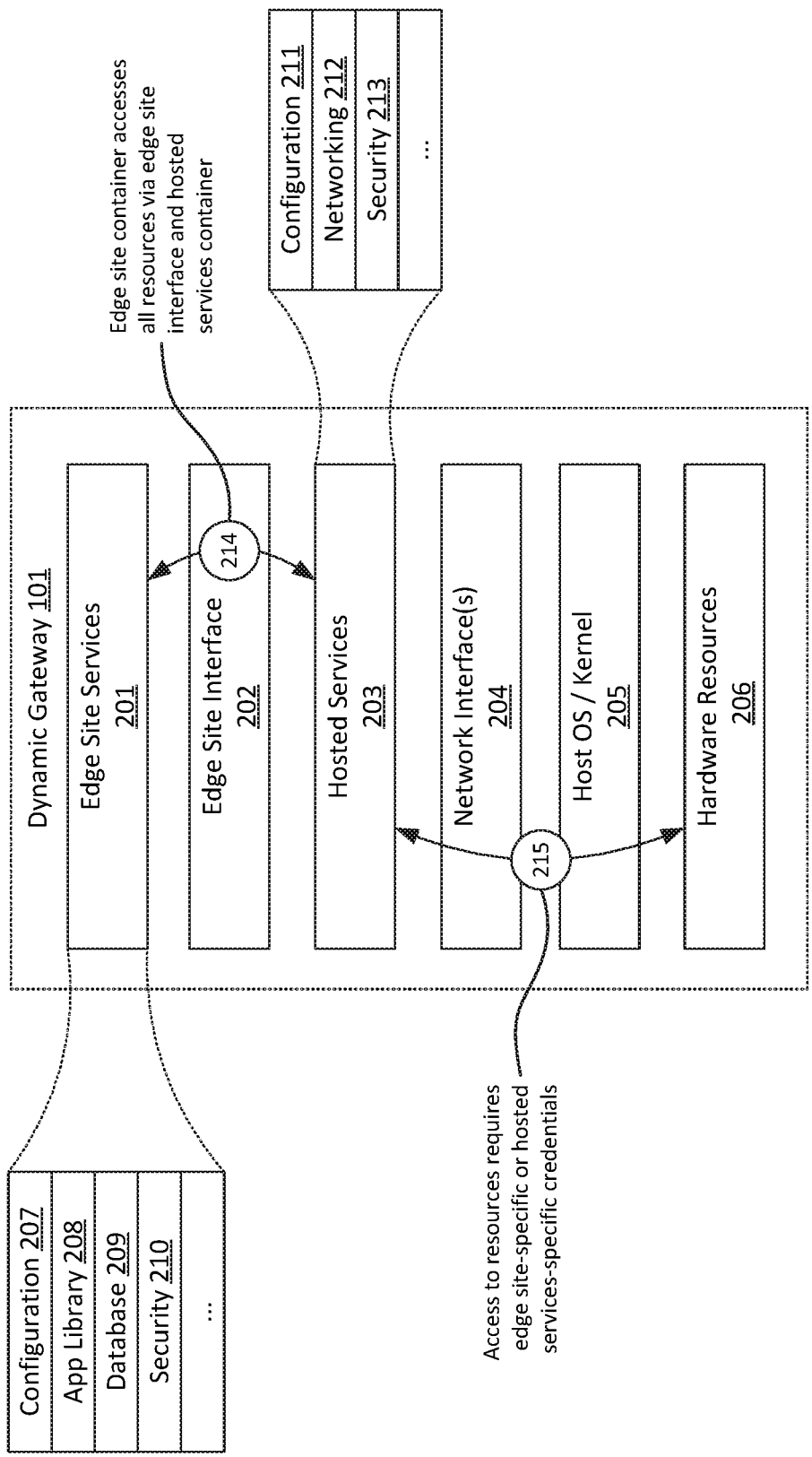
FIG. 2 illustrates example components of a dynamic gateway, in accordance with some embodiments.

FIG. 2 illustrates example components of dynamic gateway 101, in accordance with some embodiments. As shown, dynamic gateway 101 may include edge site services 201, an edge site interface 202, hosted services 203, one or more network interfaces 204, a host operating system ("OS") and kernel 205, and various hardware resources 206. Edge site services 201 and/or hosted services 203 may be implemented using various combinations of virtual machines, pods, and/or containers.

Edge site services 201 may include, or be implemented by, various pods and/or containers related to configuration 207, one or more application libraries 208, one or more databases 209, security services 210, and/or other appropriate elements, such as edge site terminal and/or network interfaces. Edge site services 201 may be managed by edge site administrator 104. Such management of services may be implemented using a dashboard or other appropriate interface that may allow for generating, updating, enabling, and/or otherwise manipulating data and/or instructions associated with edge site services 201. Access to such administrative services may be provided based on confirmation of secure administrator credentials (e.g., a username and password).

Hosted services 203 may include, or be implemented by, various pods and/or containers related to configuration 211, networking 212, and security 213, and/or other appropriate elements, such as application libraries. Hosted services 203 may be managed by host services orchestrator 103. Such management of services may be implemented using a dashboard or other appropriate interface that may allow for generating, updating, enabling, and/or otherwise manipulating data and/or instructions associated with hosted services 203.

Access to such administrative services may be provided based on confirmation of secure administrator credentials (e.g., a username and password), where the hosted services administrator credentials are different than the edge site administrator credentials. For instance, a dashboard or portal associated with edge site services 201 may only provide information and resources associated with edge site services and may not provide information or resources associated with hosted services 203 (or may provide access to a sub-set of information or resources, as specified by an administrator). A dashboard or portal associated with hosted services 203 may likewise only provide information and resources associated with hosted services and may not provide information or resources associated with edge site services 201 (or may provide access to a sub-set of information or resources, as specified by an administrator).

Edge site interface 202 may include or implement an API, and may allow service chaining 214 from edge site services 201 to hosted services 203 and/or from edge site services 201 to other resources and/or virtual resources via hosted services 203 (and edge site interface 202). Edge site interface 202 may be exposed to edge site services 201 as a specific and controlled set of network interfaces or resources. Network interface(s) 204 may include one or more interfaces, network functions, and/or virtual network functions that allow service chaining between various network resources and/or virtual network resources and the hosted services 203 and/or edge site services 201 (via hosted services 203).

Service chaining may include software-defined networking capabilities to provide a "chain" of connected network services, such as firewalls, address translators, and intrusion protection. Administrators may be able to configure network traffic paths, where each network traffic path may include various connected services depending on the desired performance characteristics, such as security, reduced latency, quality of service, etc. Such service chains may be configurable and reconfigurable and may allow automated provisioning of resources associated with dynamic gateway 101. As one example, a video or VoIP session may utilize more resources, such as processing power, network bandwidth, and memory, than browsing web sites, and thus may be associated with a video or VoIP-specific service chain having additional nodes and/or connections as compared to a web browsing service chain.

Some hosted services 203 may be available to edge site services 201 for optional use (e.g., traffic filtering), while other services may be required (e.g., routing or firewall services), and/or may be integrated into a virtual machine or hypervisor that provides resources to edge site services 201. For instance, the network interfaces 204 provided to the edge site services 201 may be implemented by hosted services 203.

Host OS and kernel 205 may include various components, layers, resources, etc. For instance, host OS and kernel 205 may include a host OS, hypervisor, virtual network services, various network functions, and/or various virtual network functions ("VNFs"). Such OpenStack agents and controllers may allow for service chaining via edge site interface 202 (and/or other automated APIs) for zero- or low-touch service delivery.

Hardware resources 206 may include processing 110, storage 111, and network resources 112, among other appropriate hardware elements. For example, hardware resources 206 may include a local interface (e.g., a wired local area network ("LAN") or wireless local area network ("WLAN") interface) that allows local devices, such as devices 107-109 to communicatively couple to dynamic gateway 101 in order to utilize edge site services 105 and/or hosted services 106. As another example, hardware resources 206 may include various network interface elements able to access network transport 102.

Access 215 to hardware resources 206 may be provided based on confirmation of appropriate administrator credentials (and/or other appropriate credentials, such as other authorized users and/or devices). For example, edge site administrator credentials may be required to access edge site resources (e.g., reserved storage space to be used for configuration data, application libraries, etc.) and host credentials may be required to access hosted services resources (e.g., reserved storage space to be used for configuration data, edge site access settings, etc.). Similarly, edge site interface 202 may provide secure access to edge site services 201, where edge site credentials are required to access elements of edge site services 201. Such secure access 215 may ensure that edge site data is not exposed to host resources (and vice-versa). In addition, secure access 215 may further ensure that edge site administrators are not able to modify or interfere with provision of hosted services 203 and/or adversely affect performance of network transport 102. Similarly, updates to hosted services 203 may not be able to interfere with provision of edge site services 201 and/or adversely affect performance of edge site services.

Figure 3:
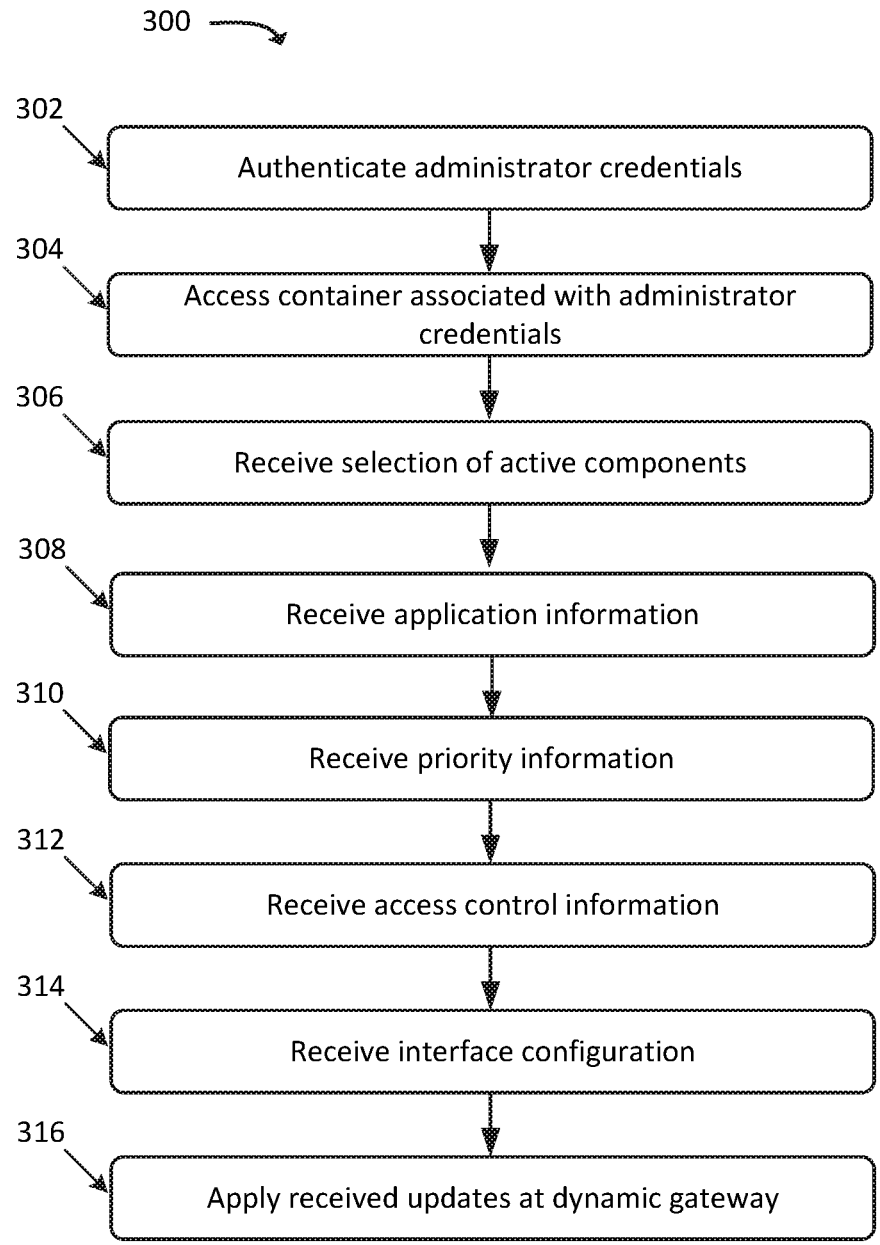
FIG. 3 illustrates an example process for managing settings of a dynamic gateway, in accordance with some embodiments.

FIG. 3 illustrates an example process 300 for managing service settings of a dynamic gateway, in accordance with some embodiments. In some embodiments, some or all of process 300 may be performed by dynamic gateway 101. In some embodiments, one or more other devices may perform some or all of process 300 (e.g., in concert with, and/or in lieu of, dynamic gateway 101).

As shown, process 300 may include authenticating (at 302) administrator credentials. Such authentication may include comparison of provided credentials to stored credentials associated with each service of dynamic gateway 101.

Process 300 may further include accessing (at 304) the service associated with the administrator credentials authenticated (at 302). For instance, as described above, access 215 to edge site resources (e.g., hardware resources 206) associated with edge site services 201 may require authentication of edge site administrator credentials while access 215 to hosted site resources associated with hosted services 203 may require authentication of host administrator credentials.

Process 300 may additionally include receiving (at 306) a selection of active components. Such a selection may be made through a dashboard or other appropriate resource. A listing of available components may be provided for selection. Such components may include components such as a router or other networking features, security or access control features, and/or other appropriate components. A host services administrator may utilize a host administrator dashboard to define a list of available hosted services and/or associated configuration settings. Different suites of services may be provided to different types of establishments. An edge site administrator may utilize an edge site administrator dashboard to select from the list of available hosted services to activate and/or deactivate services and/or otherwise configure such services.

Process 300 may also include receiving (at 308) application information. Such application information may include, for instance, a listing of applications, executable files, header or definition files, or other files associated with the various applications.

Process 300 may further include receiving (at 310) priority information regarding the various active components and/or applications. Such priority information may include, for instance, a listing of each application or component, a priority ranking, minimum or maximum required resources, and/or other appropriate information. Priority ranking information may include, for instance, a ranking of applications or other services indicating a relative priority of each service versus each other service. In some embodiments, priority ranking may include a relative grade or status, such as "high", "medium", or "low".

Process 300 may additionally include receiving (at 312) access control information. Access control information may include, for instance, a list of authorized users for each application or service or a list of authorized applications or services for each user. Different levels of access may be specified for different types of users. For instance, a cashier may only have access to a POS application, while a manager may have access to the POS application, an inventory management application, and/or other appropriate services. Some applications or services may be provided without access limitations. For example, Wi-Fi services may be provided to any user or application without requiring authentication.

Process 300 may also include receiving (at 314) interface configuration settings. The interface configuration settings may be applicable to edge site interface 202 in some embodiments. Interface configuration settings for a hosted services administrator may include additions or updates to the library of functions or calls associated with the interface. Interface configuration settings for an edge site administrator may include enabling or activating available function calls, or allowing access to specific applications, services, users, etc. Interface configuration settings may include rules for enforcement of required or mandatory service updates and optional service updates. For instance, changes to routing or firewall configuration settings may be automatically updated while changes to VoIP or network traffic settings may be updated based on various criteria, such as administrator selection, whether the associated services have been enabled or installed, and/or other relevant factors.

Process 300 may further include applying (at 316) the received updates at the dynamic gateway 101. Application of the updates may include writing data and/or instructions to a storage associated with dynamic gateway 101. Similarly, application of updates may include adding, removing, or updating components included in hosted services 203 (e.g., by installing, removing, or updating software layers associated with hosted services 203).

Figure 4:
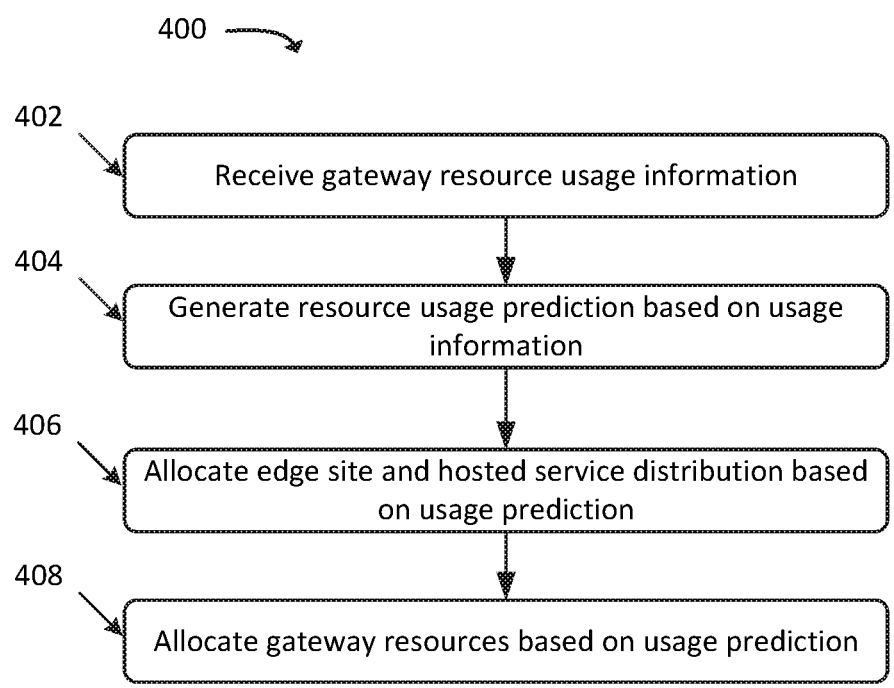
FIG. 4 illustrates an example process for allocating dynamic gateway resources, in accordance with some embodiments.

FIG. 4 illustrates an example process 400 for allocating dynamic gateway resources, in accordance with some embodiments. In some embodiments, some or all of process 400 may be performed by host services orchestrator 103. In some embodiments, one or more other devices may perform some or all of process 400 (e.g., in concert with, and/or in lieu of, host services orchestrator 103).

As shown, process 400 may include receiving (at 402) gateway resource usage information. Such usage information may be received at host services orchestrator 103 from dynamic gateway 101 and/or other network-connected resources (e.g., a remote storage associated with dynamic gateway 101). Usage information may include information associated with resources such as processing 110, storage 111, and networking 112. Usage information may be specified in various ways, depending on the type of resource, status, and/or other relevant factors. For instance, processing usage information may be specified as percentage of processor capacity used. As another example, storage information may be specified as an amount of memory utilized. Usage information may include information related to specific applications or services, users, communication channels, etc. Usage information may indicate whether resource usage was associated with edge site or hosted services. Further, usage information may include information related to message queueing or other actions taken in response to limited resource availability.

Process 400 may further include generating (at 404) a resource usage prediction based on received usage information. The resource usage prediction may be based on a specified amount of historical data (e.g., the previous day, week, or month of usage history) and/or current (or more recent) usage information. The resource prediction may be provided at various levels of specificity. For instance, in some embodiments, the prediction may include total predicted resource usage for edge site services and hosted services over a particular time period. As another example, the prediction may include predicted resource usage broken out by application or service.

Process 400 may additionally include allocating (at 406) edge site and hosted service distribution based on the usage prediction. Such allocation may include, for instance, generating a list of applications or services to be provided via the edge site services and a list of applications or services to be provided via the hosted services. Thus, as an example, if local edge site storage is nearly full, some storage requirements may be offloaded to a hosted resource until local edge site storage is freed. As another example, services previously offloaded to a hosted resource based on a processing constraint may be returned to an edge site resource when processing availability increases. Such an approach allows increased ability to scale up or scale down resource allocation relative to using only resources available at edge site hardware.

Process 400 may also include allocate (at 408) gateway resources based on the usage prediction. Such allocation may include, for instance, allocating available storage space between edge site services and hosted services (and/or allocating available storage space to specific services or applications).

Figure 5:
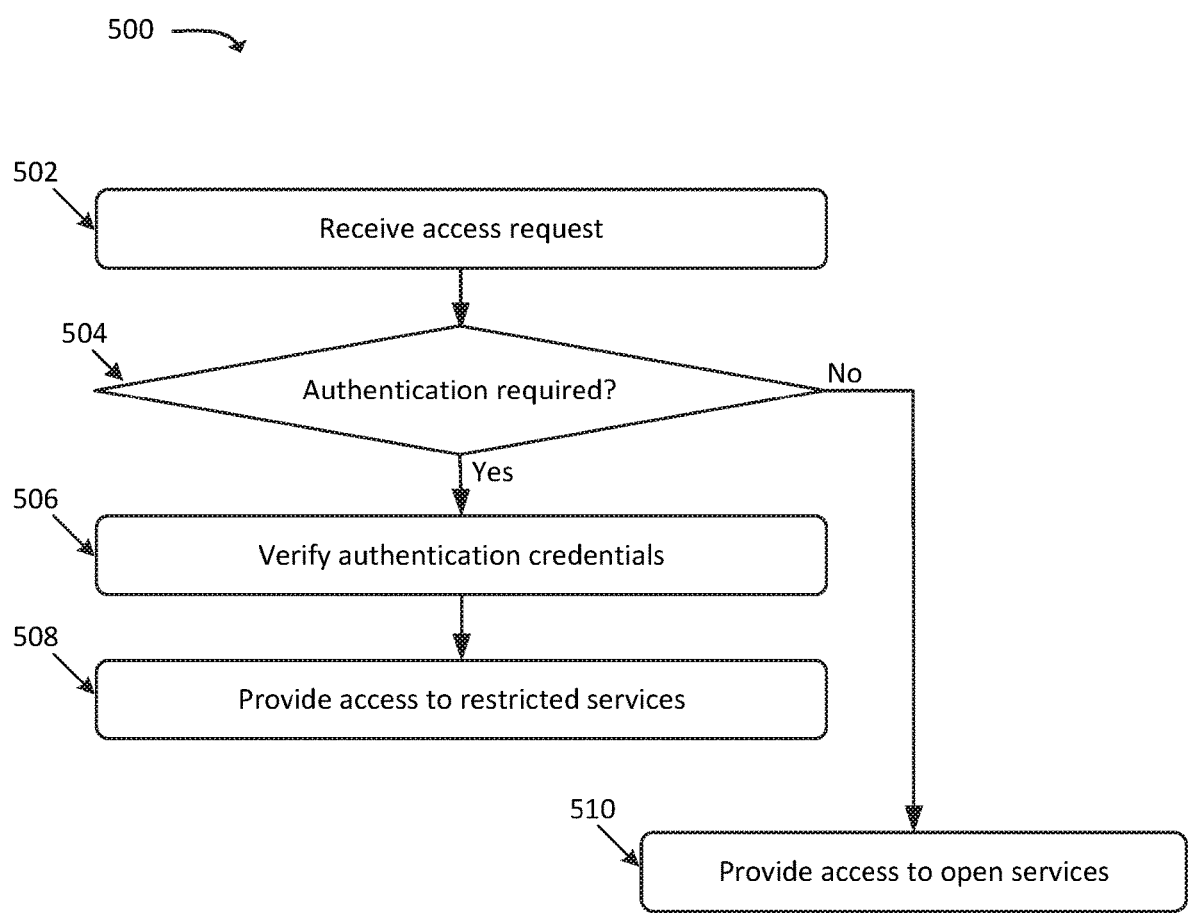
FIG. 5 illustrates an example process for providing user equipment ("UE") access to dynamic gateway services, in accordance with some embodiments.

FIG. 5 illustrates an example process 500 for providing UE access to dynamic gateway services, in accordance with some embodiments. In some embodiments, some or all of process 500 may be performed by dynamic gateway 101. In some embodiments, one or more other devices may perform some or all of process 500 (e.g., in concert with, and/or in lieu of, dynamic gateway 101).

As shown, process 500 may include receiving (at 502) an access request. Such a request may be received at dynamic gateway 101 from host services orchestrator 103, edge site administrator 104, local devices 107-109 and/or other appropriate components. The type and content of the access request may depend on the service or application to which access is attempted. For instance, a patron of a retail store may attempt to connect to a WLAN associated with the store. As another example, an employee of the store may log into a sales terminal 107 and a request to access an application or other service associated with sales terminal 107 may be sent to dynamic gateway 101. As still another example, host services orchestrator 103 may send a resource allocation message to dynamic gateway 101.

Process 500 may further include determining (at 504) whether authentication is required based on the received request. For instance, as described above, various access control features may be applied by some embodiments, such that some services are provided to authenticated users and/or devices.

Process 500 may additionally include verifying (at 506) authentication credentials. For instance, in some embodiments, device (e.g., serial number or other identifier) or user information (e.g., username and password) may be compared to a listing of allowed devices and/or users for a particular service.

Process 500 may also include providing (at 508) access to restricted services based on verification of the authentication credentials. If the credentials don't match (or no access is associated with the provided credentials), the request received at 502 may be denied, ignored, or otherwise not granted.

Process 500 may further include providing (at 510) access to the open services if process 500 determines that authentication is not required.

Figure 6:
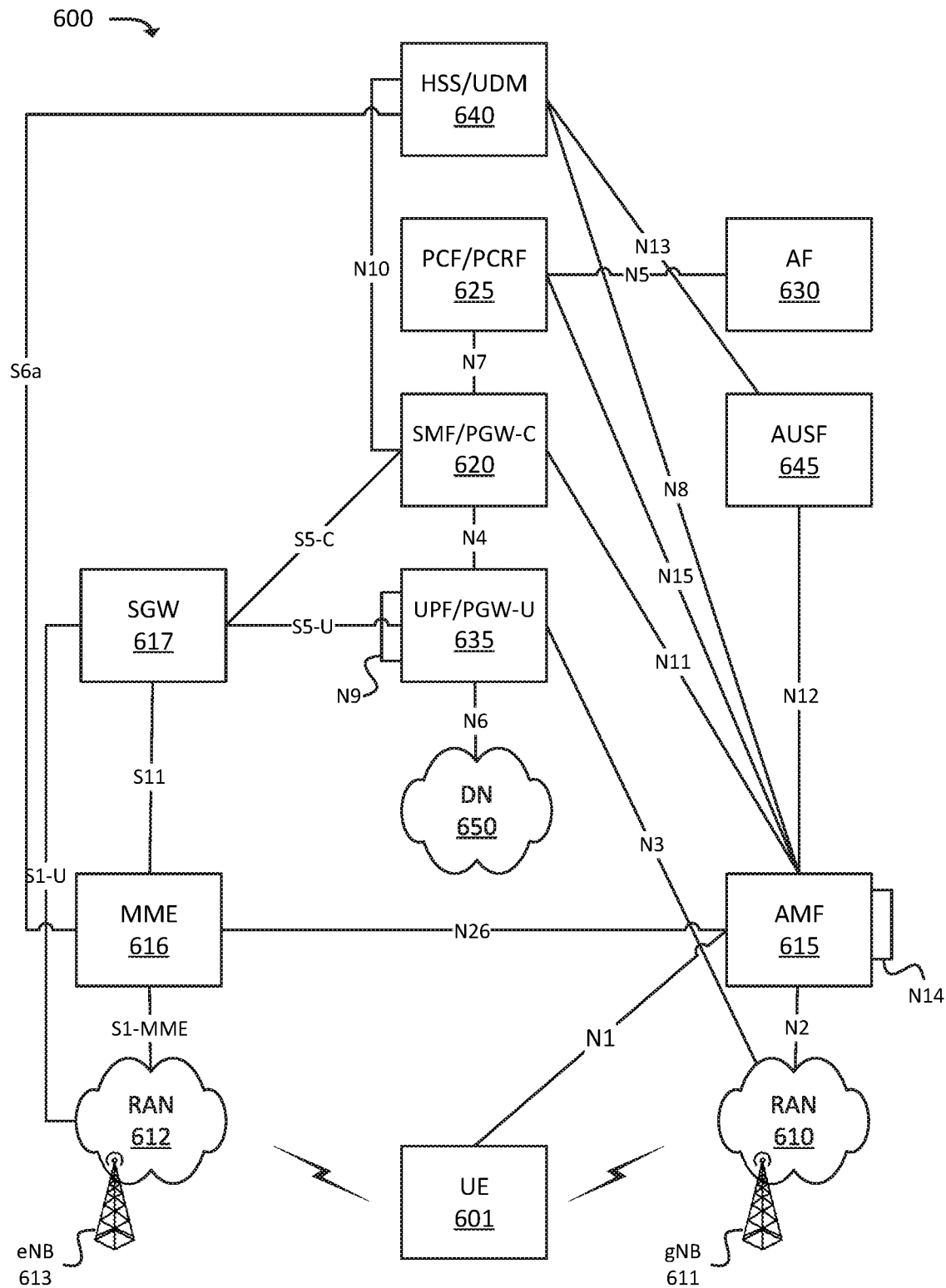
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. Such a 5G network may be included in the network transport 102 described above, among other appropriate network connections. In other embodiments, concepts described herein may be practiced via some other type of network, such as a LTE wireless network, a Third Generation ("3G") wireless network, a WLAN, a wired LAN, the Internet, and/or one or more other networks or collections of networks. In this sense, concepts described herein according to one or more embodiments may be network- or transport-agnostic.

In some embodiments, environment 600 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), Access and Mobility Management Function ("AMF") 615, Session Management Function ("SMF")/Packet Data Network ("PDN") Gateway ("PGW")—Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, Authentication Server Function ("AUSF") 645, and Data Network ("DN") 650.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610 and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 601 may send traffic to and/or receive traffic (e.g., user plane traffic) from DN 650 via RAN 610 and UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, an LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, and/or to perform other operations. In some embodiments, the 5G network may include multiple AMFs 615, which communicate with each other via the N14 interface (denoted in FIG. 6 by the line marked "N14" originating and terminating at AMF 615).

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
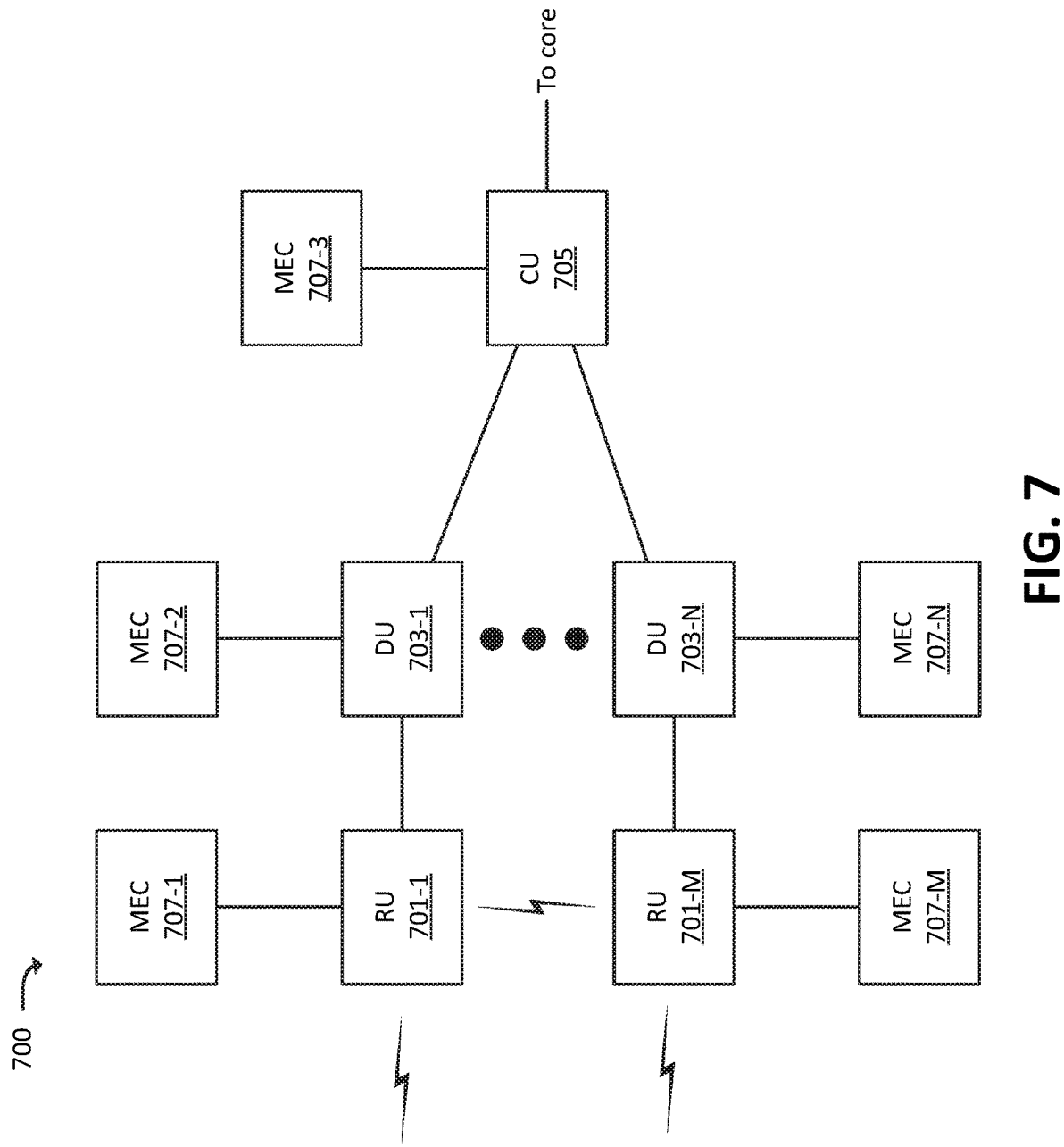
FIG. 7 illustrates an example arrangement of a radio access network ("RAN"), in accordance with one or more embodiments.

FIG. 7 illustrates an example Distributed Unit ("DU") network 700, which may be included in and/or implemented by one or more RANs (e.g., RAN 610). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Remote Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/ aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701, DUs 703 and CUs 705 may, in some embodiments, be communicatively coupled to one or more multi-access edge compute facilities ("MECs") 707. Such MECs 707 may include dynamic gateways 101 of some embodiments. Such a network 700 may include multiple connected endpoints 707 associated with a cloud service that hosts the customer interfaces, orchestration tools, application libraries, and other hosted services and edge site services provided via dynamic gateways 101.

For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, and so on. CU 705 may be communicatively coupled to MEC 707-3. MECs 707 may include hardware resources (e.g., configurable or provisionable hardware resources) that may be configured to provide services and/or otherwise process traffic to and/or from UE 601, via a respective RU 701, DU 703 and/or CU 705. For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network.

Referring back to the example discussed above with respect to deployment of dynamic gateways 101 at remote locations, in some implementations a dynamic gateway 101 may be deployed at the remote location as a MEC 707 with an RU 701. RU 701 may provide access to the networking facilities of environment 600 to UEs located within the remote location (e.g., through the wireless air interface of RAN(s) 610/612), provide wide-area network connectivity to dynamic gateway 101 (e.g., private cloud, Internet), and in some cases provide local access by local devices to services provided by dynamic gateway 101. In some implementations a dynamic gateway 101 may be deployed with one or more RUs 701 and a connected DU 703, and the dynamic gateway 101 may communicate with local devices via transmissions through an RU 701 and DU 703.

Figure 8:
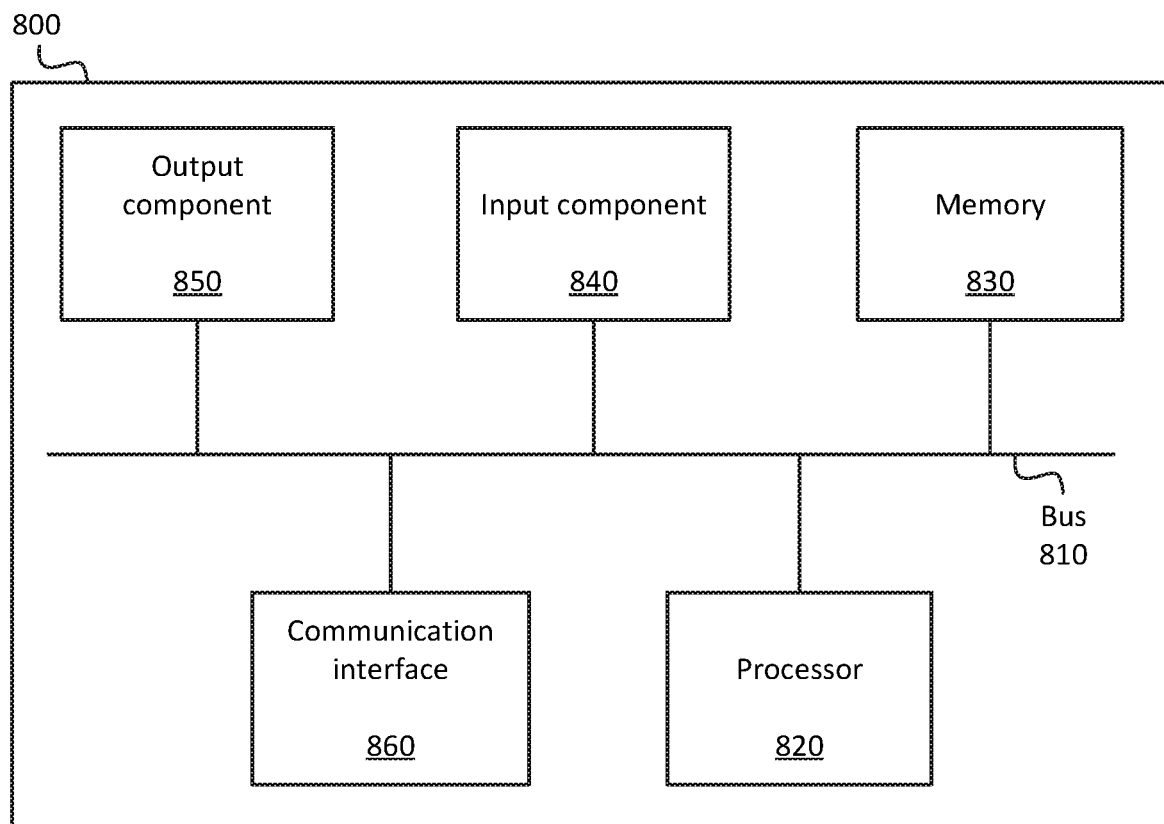
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive, at a hosted services orchestrator, resource usage information from a dynamic gateway, the dynamic gateway comprising edge site services and hosted services, wherein the hosted services include a network service that provides a virtual network interface to the edge site services, wherein providing the virtual network interface includes communicating traffic between the edge site services and a physical network interface of the dynamic gateway;

generate a resource usage prediction based at least partly on the received resource usage information;
allocate services provided by the dynamic gateway between the edge site services and the hosted services based at least partly on the resource usage prediction; and
allocate dynamic gateway resources between the edge site services and the hosted services based at least partly on the resource usage prediction, wherein:
the edge site services are implemented by one or more applications of an edge site application library stored at the device, and access to the edge site services is provided based on authentication of edge site administrator credentials,
the hosted services are implemented by one or more applications of a hosted application library and hosted services storage, and access to the hosted application library and hosted services storage is provided based on authentication of hosted services administrator credentials, wherein one or more of the hosted services are associated with managing one or more of the dynamic gateway resources, including the physical network interface, and the one or more of the hosted services provide the one or more managed dynamic gateway resources to the edge site services, and
the edge site administrator credentials are different than the hosted services administrator credentials.

2. The device of claim 1, wherein the dynamic gateway resources further include at least one processing resource and at least one storage.

3. The device of claim 1, wherein the edge site services are required to use the one or more managed dynamic gateway resources.

4. The device of claim 3, wherein the hosted services are excluded from using the one or more managed dynamic gateway resources.

5. The device of claim 1, wherein the hosted services include an application programming interface ("API") that that provides, to the edge site services, access to the managed dynamic gateway resources.

6. The device of claim 1, wherein the allocation of dynamic gateway resources is based at least partly on priority information associated with each application in the hosted application library and each application in the edge site application library.

7. The device of claim 1, wherein the virtual network interface is associated with one or more firewalls or routing policies, wherein the communicating the traffic between the edge site services and the physical network interface includes implementing the one or more firewalls or routing policies with respect to the communicated traffic.

8. A non-transitory computer-readable medium, storing a plurality of processor-executable instructions, which, when executed by one or more processors of a device, causes the one or more processors to:
receive, at a hosted services orchestrator, resource usage information from a dynamic gateway, the dynamic gateway comprising edge site services and hosted services, wherein the hosted services include a network service that provides a virtual network interface to the edge site services, wherein providing the virtual network interface includes communicating traffic between the edge site services and a physical network interface of the dynamic gateway;
generate a resource usage prediction based at least partly on the received resource usage information;

allocate services provided by the dynamic gateway between the edge site services and the hosted services based at least partly on the resource usage prediction; and allocate dynamic gateway resources between the edge site services and the hosted services based at least partly on the resource usage prediction, wherein:

the edge site services are implemented by one or more applications of an edge site application library stored at the device, and access to the edge site services is provided based on authentication of edge site administrator credentials, the hosted services are implemented by one or more applications of a hosted application library and hosted services storage, and access to the hosted application library and hosted services storage is provided based on authentication of hosted services administrator credentials, wherein one or more of the hosted services are associated with managing one or more of the dynamic gateway resources, including the physical network interface, and the one or more of the hosted services provide the one or more managed dynamic gateway resources to the edge site services, and the edge site administrator credentials are different than the hosted services administrator credentials.

9. The non-transitory computer-readable medium of claim 8, wherein the dynamic gateway resources further include at least one processing resource and at least one storage.

10. The non-transitory computer-readable medium of claim 9, wherein the edge site services are required to use the one or more managed dynamic gateway resources.

11. The non-transitory computer-readable medium of claim 10, wherein the hosted services are excluded from using the one or more managed dynamic gateway resources.

12. The non-transitory computer-readable medium of claim 9, wherein the hosted services include an application programming interface ("API") that that provides, to the edge site services, access to the managed dynamic gateway resources.

13. The non-transitory computer-readable medium of claim 9, wherein the allocation of dynamic gateway resources is based at least partly on priority information associated with each application in the hosted application library and each application in the edge site application library.

14. The non-transitory computer-readable medium of claim 8, wherein the virtual network interface is associated with one or more firewalls or routing policies, wherein the communicating the traffic between the edge site services and the physical network interface includes implementing the one or more firewalls or routing policies with respect to the communicated traffic.

15. A method, comprising:

receiving, at a hosted services orchestrator, resource usage information from a dynamic gateway, the dynamic gateway comprising edge site services and hosted services, wherein the hosted services include a network service that provides a virtual network interface to the edge site services, wherein providing the virtual network interface includes communicating traffic between the edge site services and a physical network interface of the dynamic gateway;

generating a resource usage prediction based at least partly on the received resource usage information;

allocating services provided by the dynamic gateway between the edge site services and the hosted services based at least partly on the resource usage prediction; and allocating dynamic gateway resources between the edge site services and the hosted services based at least partly on the resource usage prediction, wherein:

the edge site services are implemented by one or more applications of an edge site application library, and access to the edge site services is provided based on authentication of edge site administrator credentials, the hosted services are implemented by one or more applications of a hosted application library and hosted services storage, and access to the hosted application library and hosted services storage is provided based on authentication of hosted services administrator credentials, wherein one or more of the hosted services are associated with managing one or more of the dynamic gateway resources, including the physical network interface, and the one or more of the hosted services provide the one or more managed dynamic gateway resources to the edge site services, and the edge site administrator credentials are different than the hosted services administrator credentials.

16. The method of claim 15, wherein the dynamic gateway resources further include at least one processing resource and at least one storage.

17. The method of claim 15, wherein the edge site services are required to use the one or more managed dynamic gateway resources.

18. The method of claim 15, wherein the hosted services include an application programming interface ("API") that that provides, to the edge site services, access to the one or more hosted services.

19. The method of claim 15, wherein the allocation of dynamic gateway resources is based at least partly on priority information associated with each application in the hosted application library and each application in the edge site application library.

20. The method of claim 15, wherein the virtual network interface is associated with one or more firewalls or routing policies, wherein the communicating the traffic between the edge site services and the physical network interface includes implementing the one or more firewalls or routing policies with respect to the communicated traffic.

* * * * *